UNITED STATES PATENT OFFICE.

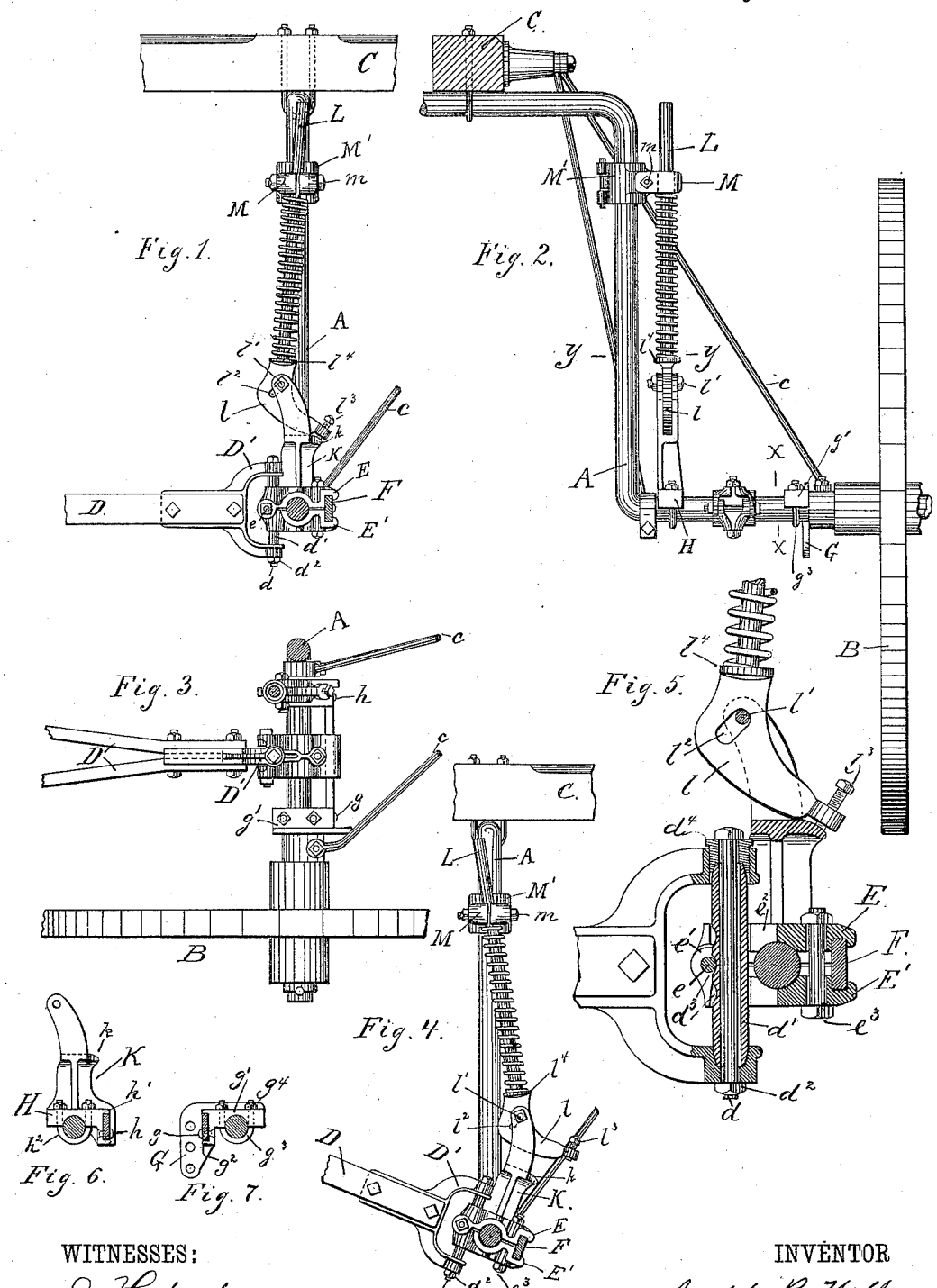

JOSEPH B. NEFF, OF BURLINGTON, IOWA, ASSIGNOR TO THE BURLINGTON PLOW COMPANY, OF SAME PLACE.

CULTIVATOR.

SPECIFICATION forming part of Letters Patent No. 302,580, dated July 29, 1884.

Application filed April 4, 1884. (No model.)

*To all whom it may concern:*

Be it known that I, JOSEPH B. NEFF, a citizen of the United States, residing at Burlington, in the county of Des Moines and State of Iowa, have invented certain new and useful Improvements in Wheeled Cultivators, of which I do declare the following to be a full, clear, and exact description, reference being had to the accompanying drawings, constituting part of this specification.

My present invention has relation to the improvement of wheeled cultivators, and particularly does it relate to that class of wheeled cultivators wherein spring mechanism is employed for the purpose of assisting the operator in raising and lowering and controlling the plows, and for the further purpose of preventing the accidental rising of the plows from the ground when in operation.

In the construction of this class of cultivators it has been heretofore proposed to connect the swinging plow-carrying beam to a pipe-box fitted loosely on the cultivator-axle, and provided with a projecting arm, to which was fitted a plate of peculiar construction, having at its top pivot-seats for two other plates, which in turn were connected to a rod carrying a spring that acted upon the plow-beams. The arrangement of the rocking arm, the spring-carrying arm, and the several intermediate plates was such that the spring tended to hold the plow in the ground during operation, and to lift the beam when the plow was to be thrown out of action. This construction, while proposed for a much desired end, is unnecessarily complicated and expensive and liable to get out of repair. A further objection to this construction is that no provision is made for adjusting the journal-bearing of the plow-beam and the spring mechanism to compensate for the wear incident to the swinging of the beam. Spring mechanism has also been heretofore used wherein two springs were employed, one to assist in elevating the plows when raised above the working-point, and the other to suspend the plows at a normal working-point. This construction is defective, however, in that it requires of the operator a constant and tiresome pressure against the force of the suspension-spring in order to hold the plows in the ground when working in dead-furrows or low places, or where the cultivator-wheels are lifted in passing over ridges.

The object of this invention is to provide an improved and simplified construction of spring mechanism that shall serve to aid in lifting the plow-beams when the plows are to be thrown out of action; that shall exert pressure to assist the operator in keeping the plows at a proper depth of cut and prevent their rising from the ground; that shall suspend the plows at any desired working-point, so as to relieve the operator from the labor of carrying their weight on his arm when working in loose soil or with very sharp plows; that shall so counterbalance the weight of the plows at different working-points as to allow them to be run into dead-furrows or low places without the necessity of severe effort on the part of the operator to lift or depress them, and that shall allow for the more effective adjustment of the plows to any desired working-point.

The object of my invention is also to provide improved means whereby the plow-beams and spring mechanism may be connected with the journal whereon the plow-beams swing, in such manner as to permit adjustment of parts to compensate for the wear incident to the swinging of the beams.

To this end my invention consists in pivoting directly to a projecting arm that swings with the plow-beam the rod that carries the spring which acts upon the plow-beam, the point of pivotal connection between the arm and rod being so arranged as to be above and slightly to the rear of the beam-journal during operation, and to be above and in front of such journal when the plow-beam is lifted. The effect of this arrangement is to greatly simplify and cheapen the construction, and to accomplish the desired end of mechanically aiding the operator in holding the plow in the ground when in operation, and in lifting it from the furrow when necessary.

My invention further consists in connecting the plow-beams with the spring mechanism in such manner that the spring will exert sufficient pressure to sustain the plow-beams at different working-points, so that these points may be changed at the will of the operator by using very little force in lifting or depressing the beam-handles. The operator is thus enabled, with but slight effort, to hold the plows in the ground when they work in low places or dead-furrows, or when the wheels are lifted in passing over ridges. By this construction I overcome an objectionable feature of the ordinary spring mechanism heretofore employed, in which the plows, when working below the dead-center, were pressed downward with a force that increased as the plow descended, so that when the plows ran in dead-furrows or low places the operator, in raising them to the normal working-point, was compelled to lift not only the weight of the plows, but also the downward thrust of the spring.

My invention further consists in providing the rocking arm, to which the spring-carrying rod is directly pivoted, with a stop or shoulder, against which the end of the rod may strike to limit its movement, and consequently that of the plow-beam.

The invention also consists in providing a slotted or loose pivotal connection between the rocking arm and the spring-carrying rod, pivoted thereto, and mechanism for varying the relative movement of said arm and rod whereby the depth of cut of the plow-beam can be readily controlled.

The invention further consists in connecting the plow-beam and the spring mechanism that acts thereon to the beam-journal in such manner that the journal-bearings of the plow-beam and spring mechanism (one or both) can be adjusted to compensate for the wear incident to lifting the beam.

My invention comprises, also, various details of construction, which will be hereinafter fully described, and defined in the claims at the end of this specification.

In the accompanying drawings, Figure 1 is a view in vertical section on line $x\ x$ of Fig. 2, parts being shown in elevation. Fig. 2 is a view in rear elevation, the plow-beam being omitted. Fig. 3 is a view in horizontal section on line $y\ y$ of Fig. 2, parts being shown in plan. Fig. 4 is a view in vertical section on line $x\ x$ of Fig. 2, the parts being shown in the position assumed when the plow-beam is lifted. Fig. 5 is an enlarged detailed view in vertical section through the journal-bearing of the plow-beam, parts being shown in side elevation. Figs. 6 and 7 are sectional views on lines $v\ v$ and $x\ x$ of Fig. 1, respectively, showing in detail the inner sides of the hitch-clevis and rocking-arm clamp.

A designates the arched axle of the cultivator, on the ends of which are journaled the wheels B, and to the top of which is connected the pole C, braced by suitable stay-rods, $c$, bolted to the lower arms of the axle. Upon these lower arms are sustained the journal-bearings of the plow-beams, the spring mechanism, and the hitch-clevis, in a manner now to be described.

To the end of the plow-beam D is connected the beam-yoke D′, through the perforated ends of which passes the pin or bolt $d$, carrying the sleeve $d'$, having its lower end held in a suitable seat of the yoke-arm, and its upper coned end received within the coned inner face of washer $d^4$. By tightening nut $d^2$ on end of bolt $d$, the washer $d^4$ is drawn down upon sleeve $d'$ to hold the parts securely and to take up the wear. The pin $d$ and grooved sleeve $d'$ pass through the rear portion of the journal-bearing which serves to connect the plow-beam to the axle. This journal-bearing consists of the sections E E′, preferably hinged together by a bolt, $e$, and furnished with enlarged perforated rear portions, $e'$, through which extends the grooved sleeve $d'$. The bolt $e$ is so placed with reference to the perforations of the portions $e'$ as to fit within the grooves $d^3$ of the sleeve $d'$, so that the end of the plow-beam may be held in different positions with relation to its supporting-journal, and the depth of cut of the plows be correspondingly modified. The sections E E′ of the beam-journal bearing have suitable horizontal half-slots formed therein, which receive the axle A, and slots or perforations $e^2$ may be formed in the sections to allow for the proper lubrication of the axle without removal of parts, and to allow the bolt $e$ to exert a greater clamping frictional force. The front portions of the journal-bearing sections have seats upon their inner faces to receive the connecting-bar F, the function of which will presently appear, and are provided with vertical perforations for the bolt $e^3$, which serves to adjust the sections properly to the axle, and thus compensate for the wear that is occasioned by the swinging of the beam.

To the outer end of the bar F is connected, by means of the screw or rivet $g$, the bearing-plate $g'$ of the hitch-clevis G. The front of this bearing-plate is furnished with the seat $g^2$, to receive the end of the bar F, and the plate is held to the axle by means of some suitable clamp—as, for example, the loop $g^3$, the threaded ends of which pass upward through the plate, and are provided with the nuts $g^4$, which serve to adjust the bearing-plate when from long usage or other cause it has become loose upon the axle. The inner end of the bar F is held by means of the screw $h$ within the seat $h'$, formed in the front portion of the bearing-plate H, which is adjustably held on the axle by means of the loop $h^2$, and serves to sustain the spring mechanism that acts upon the plow-beam. It will thus be seen that adjustable bearings are provided for the plow-beam, its spring mechanism, and the hitch-clevis, which can be kept snugly in place against the axle, irrespective of wear, and will thus avoid all uncertain action and rattling of parts incident to long usage in machines having non-adjustable bearings.

I desire it to be understood that, although I have here shown separate bearings for the plow-beam, the clevis, and the spring mechanism, I regard the scope of my invention as sufficiently broad to cover a single adjustable bearing that may serve to sustain either or all of these parts.

From the top of the bearing-plate H, and preferably formed integral therewith, rises the projecting or rocking arm K, the upper end of which, from the stop or shoulder $k$, is forked to form journal-bearings for the angular flattened end $l$ of the rod L, which is pivotally connected to the rocking arm by means of the bolt $l'$, that passes through the inclined slot $l^2$ of the rod. The lower end of this rod L is provided with a threaded perforation, through which passes the set-screw $l^3$, that bears against the stop or shoulder $k$, and serves to limit the downward movement of the rocking arm. At the top of the flattened portion of the rod L is formed the flange $l^4$, upon which rests the spiral spring L', the upper end of which bears against the extension M of the sectional hinged clamp M', that is held on the axle by means of the bolt $m$, the position of this clamp on the axle serving to determine the pressure of the spring.

From the foregoing construction it will be seen that when the parts are in operation, the plow-beams being approximately horizontal, as seen in Fig. 1, the point of pivotal connection between the rocking arm K and the spring-carrying rod L will be above and slightly in the rear of the axle. With the parts in such position, the spring L' will offer its resistance to the forward movement of the rocking arm, and will thus tend to prevent the accidental rising of the plows from the ground, and at the same time will offer sufficient resistance to the downward movement of the bolt $l'$ in the slot, and the consequent further depression of the beams to hold the plows suspended at their working-point. If now, however, it is desired to lift the plows, it is necessary for the operator to use force only in their initial upward movement until the pivotal point or dead-center of the rocking arm and spring-carrying rod is thrown in front of the axle, when the springs will aid in lifting the plows or holding them in desired suspension. By pivoting the spring-carrying rod directly to the rocking arm the construction is much simplified, its cost is lessened, and its durability is increased. It will be seen that the striking of the flattened end of the rod L against the stop or shoulder $k$ serves to arrest the further rocking of the arm H, and consequently the downward movement of the plows. The inclined slot $l^2$ allows for an easy downward movement of the plow-beam after the end of the rod has struck the shoulder $k$, and until the pivot-pin reaches the bottom of the slot. It will be seen, however, that the extent of this movement can be limited by means of set-screw $l^3$, by the adjustment of which the depth of cut of the plows can with exactness be restricted. It is to be noticed that the slot $l^2$, in which works the pivot-bolt $l'$, is formed in such wise as to permit the bolt to traverse its length as the rocking arm turns about the axle as its pivotal point. When the plow-beams are pressed downward—as in working in dead-furrows or low places—the screw $l^3$, bearing upon the shoulder $k$, will be elevated thereby, and will tend to lift the rod L against the tension of the spring L'. This tendency to lift the spring-carrying rod causes the spring to exert sufficient pressure to counterbalance the weight of the plow-beams, so that the plows will be sustained or carried by the force of the spring at any desired working-point within the range of the slot $l^2$, and with very little effort can be raised or lowered by the operator.

It will be understood, of course, that my present improvements are applicable alike to cultivators, walking-plows, and kindred implements, and to the skilled mechanic it will be apparent, also, that the precise details of construction set out may be extensively varied without departing from the scope of the invention. Thus, for example, instead of employing the loops $g^3$ and $h^2$, the castings may extend around the axle so as to nearly, but not entirely, meet, the ends being drawn toward each other, and thus forced to securely clasp the axle by means of a suitable adjusting-bolt. So, also, if desired, the connecting-bar F may be cast in one piece with the bearing-plate $g'$ and bearing-plate H, instead of being attached thereto, as shown.

Having thus described my invention, what I claim as new, and desire to secure by Letters Patent, is—

1. In a cultivator, the combination, with the axle and a vertically-swinging beam, of a rocking arm in connection with said beam, and a spring-carrying rod pivotally attached directly to said arm, said rocking arm being provided with a stop or shoulder, against which the end of said rod may strike to limit its movement, substantially as described.

2. In a cultivator, the combination, with the axle and the plow-beam, of a rocking arm connected with the plow-beam, and a spring-carrying rod united to the rocking arm by a freely-shifting pivotal connection, and adapted to be lifted by the rocking arm to hold the beam in different working positions, substantially as described.

3. In a cultivator, the combination, with the axle and the plow-beam, of a rocking arm connected with said beam and having a forwardly-extending shoulder, and a spring-carrying rod having a forwardly-projecting end, said rod and rocking arm being pivotally united, substantially as described, whereby when the beam is swung below the normal working position the projecting shoulder of the rocking arm will tend to lift the spring-carrying rod, thereby causing the spring to sustain the beam at different working-points, substantially as set forth.

4. The combination, with the cultivator-axle and a vertically-swinging beam, of a rocking arm in connection with said beam, and a spring-carrying rod pivotally connected to said arm, said rocking arm being provided with a stop or shoulder, against which the end of said rod may strike, and said rod being furnished with a slot to receive the pivot-bolt, substantially as described.

5. The combination, with a vertically-swinging beam, of a rocking arm in connection with said beam, and a slotted spring-carrying rod pivoted to said rocking arm, and provided with an adjusting-screw arranged to bear against and limit the movement of the rocking arm and of the beam, substantially as described.

6. The combination, with a vertically-swinging beam, of a rocking arm in connection with said beam, and a spring-carrying rod pivotally connected to said rocking arm, and having an angular portion provided with a long slot to receive a pivot-bolt, and with an adjusting-screw to strike the rocking arm, substantially as described.

7. In a cultivator, the combination, with the axle and the plow-beam, of a rocking arm having an enlarged base in shape of a journal-bearing adapted to fit directly on the axle, an adjustable connection for holding said bearing on the axle, a spring-carrying rod, and a spring, substantially as described.

8. The combination, with the cultivator-axle, a vertically-swinging beam, a rocking arm, and spring mechanism for acting thereon, of adjustable bearings for sustaining said parts, fitted directly on the axle, and a bar connecting said several bearings, substantially as described.

9. The combination, with the cultivator-axle, a vertically-swinging beam, a rocking arm, spring mechanism for acting on said arm, and a hitch-clevis, of an adjustable bearing for the rocking arm, an adjustable bearing for the hitch-clevis, a bearing for the beam, and a bar rigidly connecting the several bearings, substantially as described.

10. In a cultivator, the combination, with the beam-yoke, the axle, and the beam-yoke journal-bearing, of the adjusting-bolt, the coned sleeve, and the coned washer through which said bolt passes, substantially as described.

11. In a cultivator, the combination, with the axle, the beam-yoke, and the yoke-sleeve, of the beam-yoke coupler or bearing, adjustably connected to the axle and to the yoke-sleeve, and having adjustable jaws to receive a connecting-bar, substantially as described.

In testimony whereof I have hereunto set my hand this 31st day of March, A. D. 1884.

JOSEPH B. NEFF.

Witnesses:
J. H. RANEY,
JNO. J. FLEMING.